United States Patent
Deegan et al.

(10) Patent No.: US 9,057,118 B2
(45) Date of Patent: Jun. 16, 2015

(54) PLASMA METHOD AND APPARATUS FOR RECOVERY OF PRECIOUS METALS

(75) Inventors: David Deegan, Bampton (GB); Tim Johnson, Moreton-in-Marsh (GB)

(73) Assignee: Tetronics (International) Limited, Swindon (GB)

(*) Notice: Subject to any disclaimer, the term of this patent is extended or adjusted under 35 U.S.C. 154(b) by 521 days.

(21) Appl. No.: 13/130,886

(22) PCT Filed: Nov. 24, 2009

(86) PCT No.: PCT/GB2009/002747
§ 371 (c)(1),
(2), (4) Date: Jul. 19, 2011

(87) PCT Pub. No.: WO2010/058188
PCT Pub. Date: May 27, 2010

(65) Prior Publication Data
US 2011/0274580 A1   Nov. 10, 2011

(30) Foreign Application Priority Data
Nov. 24, 2008   (GB) .................................. 0821448.8

(51) Int. Cl.
C22B 11/02   (2006.01)
C22B 4/00    (2006.01)
C22B 9/22    (2006.01)

(52) U.S. Cl.
CPC .............. *C22B 11/021* (2013.01); *C22B 11/02* (2013.01); *C22B 4/005* (2013.01); *C22B 9/226* (2013.01); *C22B 11/026* (2013.01)

(58) Field of Classification Search
CPC ....................................................... C22B 11/02
USPC ..................... 75/10.19, 10.67, 414, 631–633; 164/146, 502, 505
See application file for complete search history.

(56) References Cited

U.S. PATENT DOCUMENTS

| 3,662,811 A | 5/1972 | Esslinger et al. |
| 4,381,943 A | 5/1983 | Dickson et al. |

FOREIGN PATENT DOCUMENTS

GB    2090616 A    7/1982

OTHER PUBLICATIONS

International Search Report, PCT/GB2009/002747, dated Apr. 14, 2010, 5 pages.
Written Opinion, PCT/GB2009/002747, dated Apr. 14, 2010, 6 pages.

*Primary Examiner* — Brian Walck
(74) *Attorney, Agent, or Firm* — Senniger Powers LLP (57) ABSTRACT

The present invention relates to a method, and apparatus for the recovery of precious metals. Accordingly, it provides a continuous process for obtaining a precious metal composition from a feedstock material, the process comprising the steps of: (i) heating a feedstock material in a plasma furnace to form an upper slag layer and a lower molten metal layer; (ii) removing the slag layer; (iii) removing the molten metal layer; (iv) allowing the removed molten metal layer to solidify; (v) fragmenting the solidified metal layer to form fragments; and (vi) recovering a precious metal composition from the fragments; wherein the feedstock material comprises a precious metal containing material and a collector metal, said collector metal being a metal or an alloy that is capable of forming a solid solution, an alloy or an intermetallic compound with one or more precious metals. This allows for high recovery yields of precious metals. The apparatus comprises a plasma furnace, a casting table enabling continuous casting of the molten metal pool to form a solidified sheet, a fragmentation device and a separation unit for recovering precious-metal-rich alloy from the sheet fragments.

19 Claims, 8 Drawing Sheets

Fig.2

Fig. 3a (NOx)

PLASMA METHOD AND APPARATUS FOR RECOVERY OF PRECIOUS METALS

REFERENCE TO RELATED APPLICATIONS

This application is the U.S. national stage application of International Patent Application No. PCT/GB2009/002747, filed Nov. 24, 2009, and claims the benefit of Great Britain Application No. 0821448.8, filed Nov. 24, 2008, the entire disclosures of which are incorporated herein by reference.

INTRODUCTION

The present invention relates generally to the field of extractive metallurgy, more particularly to a process, product and apparatus relating to the recovery of platinum-group-metals and other high-value metals hereinafter referred to as precious metals.

BACKGROUND

Metals can be extracted from a number of primary and secondary sources. Primary sources include ores and naturally occurring solutions and mixtures comprising metal ions. Secondary sources include wastes, spent catalysts, process residues and mine tailings. In view of the scarcity of some metals and the cost and difficulties involved in the extraction of metals from primary sources, recovery processes for extracting metals from secondary sources are key.

Of particular interest are precious metals, and specifically the platinum-group-metals which are expensive due to their low natural abundance and the complex processes that are required for their extraction and refining from primary sources. Whilst the platinum-group metals are found as naturally occurring ores, for example sperrylite (platinum arsenide), these metals may also be obtained by recycling platinum-group-metal bearing wastes. The platinum-group-metals have outstanding catalytic properties and suitable waste is often catalytic waste such as crushed autocatalyst ceramic monolith, catalytic soot filters or heterogeneous process catalyst on a variety of different substrates.

Known methods of obtaining precious metals include cupellation, hydrometallurgical leaching and thermal decomposition and/or recovery processes. Thermal systems using plasma arcs are known, and have been applied to platinum-group metal recovery. High-temperature plasma arcs are heat sources of intense power and versatility, combining the heat of a plasma arc with the stability and control of a gas flame.

In a submerged arc furnace (SAF) a graphite electrode that is in direct contact with the melt is used as the means of providing electrical power. The graphite electrode is very large due to the high currents employed and, therefore, requires heavy lifting and handling equipment. This results in exaggerated graphite consumption of the order of 20 kg MWh$^{-1}$. Such furnaces operate on a batch process and the feedstock is formulated to deliver the correct slag resistivity/chemistry as energy is provided to the process through resistive heating.

U.S. Pat. No. 4,685,963 discloses a process for the extraction of platinum-group-metals from various feedstocks where a plasma 'flame' at between 5,000° C. and 10,000° C. is used to superheat the upper slag layer to accelerate association within the collector material due to improved fluid flow patterns. The 'superheated zone' produces extreme localised heating and boiling, and churns and stirs the molten furnace contents. Reference is made to small 'particles' of platinum-group metals and collector material suspended in the slag and to the role of fluidity in their aggregation. These individual phases agglomerate discretely and migrate to become associated with each other at the base of the vessel.

There is, therefore, a desire for a process and/or apparatus that will improve the recovery of precious-metals, or at least mitigate some, or all, of the problems associated with the prior art, or provide a useful alternative.

STATEMENT OF THE INVENTION

In a first aspect, the present invention provides a continuous process for obtaining a composition that is rich in precious-metals from a feedstock material, the process comprising:
(i) heating a feedstock material in a plasma furnace to form an upper slag layer and a lower molten metal layer;
(ii) removing the slag layer;
(iii) removing the molten metal layer;
(iv) allowing the removed molten metal layer to solidify;
(v) fragmenting the solidified metal layer to form fragments; and
(vi) recovering a composition that is rich in precious-metals from the fragments;
wherein the feedstock maternal comprises a precious-metal-containing material and a collector metal, said collector metal being a metal or an alloy that is capable of forming a solid solution, an alloy or an intermetallic compound with one or more precious-metals. The feedstock may optionally slag-making materials and/or reducing agents.

In a second aspect, the present invention provides a precious-metal-rich composition obtained by the process of the present invention, wherein the composition comprises an alloy, an intermetallic compound or a solid-solution, of one or more precious-metals within the crystal structure of one or more phases of the collector metal.

In a third aspect, the present invention provides an apparatus for performing the continuous process of the present invention, the apparatus comprising:
(1) a plasma furnace for heating a feedstock material;
(2) a casting table;
(3) a fragmentation device for fragmenting the cooled metal layer; and
(4) a separation unit for recovering a precious-metal-rich alloy from the fragments;
wherein the plasma furnace has an input port and at least one output port, is heated by one or more plasma device and is adapted to permit slag removal;
said plasma device being a plasma torch and/or electrode, and
wherein the casting table allows for continuous casting of the molten metal layer to form a solidified sheet.

The separation unit is preferably a physical separator, such as a magnetic separator, eddy current separator or a separator that works on mineral or chemical separation techniques. Optionally, the apparatus may further comprise one or more ladles for holding the molten metal layer and/or transferring it to the casting table.

The plasma device is preferably one or more plasma torch and/or electrode. A preferred electrode is a graphite electrode. Plasma torches can be used together with electrodes. The use of a plasma torch or torches alone is most preferred. The casting table allows casting of the molten metal layer to form a solidified sheet.

The process of the present invention is for obtaining a composition rich in precious metals by treatment of various feedstock materials. Precious metals include gold and silver as well as platinum-group-metals, which may be abbreviated as PGMs, which include ruthenium, rhodium, palladium, osmium, iridium and platinum. That is, platinum-group-metals are a subset of precious metals. The process of the invention is capable of obtaining single metals or combinations of two or more thereof. Whilst the description hereafter refers to precious metals and platinum-group-metals throughout, it would be understood by one skilled in that art that the process could be used to recover any of the above metals from a feedstock. It should also be appreciated that the technique could be applied in relation to transition metals or generally any metal.

It is preferable to use the process of the present invention to recover both platinum-group-metals and precious metals. Precious metals include the platinum-group-metals, gold and silver and other metals, which by their scarcity, command a high market price. Most preferably the process is used to recover platinum-group-metals. The present inventors have discovered that the process is especially suitable for the recovery of platinum-group-metals because they are typically present in waste in very small amounts and the process particularly minimises the loss of these metals into slag by-products.

The feedstock material from which the precious-metal-rich composition may be obtained can comprise any precious-metal-containing material. Such materials include primary sources, such as ores, and secondary sources, for example, waste from recycling, spent catalysts and precious-metal containing residues from industrial and/or health care processes. The process is particularly suitable for processing secondary sources. Suitable materials include, but are not limited to, autocatalyst, chemical catalyst, petrochemical catalyst, pharmaceutical catalyst, waste electrical and electronic equipment waste, thermal barrier coating waste, dental treatment waste, electroplating waste and jewelry waste.

In order to maximise the efficiency of the process, careful selection of complementary mixes of feedstock, for example, complementary catalyst types, can preferably be selected. The selection and blending may be performed for a number of reasons, including, for example, providing a more homogeneous feedstock. Waste with higher concentrations of platinum-group-metals, particularly autocatalysts, are preferred for higher yields.

The collector metal is a metal or an alloy that is capable of combining with one or more precious-metals, preferably by forming a solid solution, intermetallic compound or an alloy. Preferably the collector metal comprises iron, nickel, copper, silver, zinc, cobalt, or alloys containing these as the principle element; more preferably it comprises iron or copper and most preferably iron. In one embodiment the collector metal can be provided to the furnace as two or more collector-metal-forming components, that is, as the component metals or as alloys that combine to form an alloy of the desired collector metal composition.

Iron is most preferred as a collector metal, as the primary element in a collector metal alloy, or as a collector metal-forming component, due to its low cost, ready availability and strong ferromagnetic properties which allow for easy separation from non-magnetic residues. It is also compatible with the processing involved in an optional final refining step. The inventors have found that an iron based alloy can be engineered so that it has a low melting point and is relatively brittle, which aids the fragmentation step. Copper is also preferred due to its low cost, ready availability and ease of separation from platinum-group-metals and precious metals.

A solid solution is a solution of one or more solutes in a solvent, all in the solid-state. Such a mixture is considered a solution rather than a compound because the crystal structure of the solvent remains unchanged by addition of the solutes, although the lattice parameters can change, and the mixture comprises a single chemically homogeneous phase. The solute, in this case the precious-metals, may incorporate into the solvent crystal lattice, that is, the collector metal structure, substitutionally by replacing a solvent particle in the lattice, or interstitially by fitting into the space between solvent particles. An example of a typical solid solution produced by the process of the present invention is set out in the Examples.

An alloy is a combination of two or more components, at least one of which is a metal. The alloy itself exhibits metallic properties. Alloys may be solid solutions, as, for example, in α-brass (copper 70%-zinc 30% alloy). However, in contrast to a solid solution, in an alloy the crystal structure of the solvent may be changed by the introduction of the solute to a separately identifiable phase with a different crystal structure as, for example, in α-β brass (copper 60%-zinc 40% alloy), or in the intermetallic compound, $TiAl_3$. Hence an alloy may exhibit different properties from the primary/solvent component.

The benefit of the precious-metals forming a solid solution, alloy or intermetallic compound with the collector metal is that it allows the precious-metals to segregate from the feedstock and consolidate in the collector metal. The collector metal then acts as a robust repository for the precious-metals. The collector metal is further shielded from the gaseous environment by a slag layer. This protects the solute content from reaction with the gaseous environment and helps to make the process viable as a continuous process.

It is preferable to select the mass of collector metal in the feedstock material relative to the mass of the precious-metals in the precious-metal-containing material based on the total mass of these two components. Preferably the collector metal comprises from 50% to 99% of the total amount. More preferably 80% to 97.5% and most preferably 90% to 95%.

In particular it is desirable to achieve a balance between the amount of collector metal and the amount of precious-metals present in the precious-metal containing material in the feedstock. This can be determined by chemical analysis. The ratio, or relative amount, is an important balance. The inventors have discovered that when the ratio provides precious metal concentrations of less than 10% a by weight in the collector, yields of recovered precious-metals are high. However, as the concentration increases, i.e. especially above 15% of precious-metals by weight, the recovery rate of precious-metals from the precious-metal-containing feedstock is lower. That is, more of the precious-metals are retained in the slag layer. It is advantageous to use a large amount of collector metal relative to the precious-metal content of the feedstock.

The feedstock material may also contain further additives. These additives include intentional additives, including reducing or oxidising agents. Reducing agent additives, for example, a source of carbon, make the furnace environment reducing and improve the recovery rate by minimising the loss of precious-metals by oxidation.

The choice of particular additives can help to minimise the amount of slag produced and increase the process efficiency. Preferred additives may bind to unwanted impurities in the molten metal layer and be removed in the slag. The process can also deal with unintentional additives which are included with the feedstock, for example, catalytic substrate materials or casings from electrical equipment. Preferably, unintentional additives are minimised.

It is also possible to include additives to engineer the slag composition. The slag is a liquid mixture of inorganic species such as ash, flux, and other impurities. The additives can be selected after consideration and analysis of the composition of the precious-metal-containing material that is to be processed. Suitable additives include fluxing agents. Fluxing agents, which are optionally pre-blended into the feedstock, are added to the feedstock to ensure that the resulting slag phase has desirable properties (such as low viscosity and high/low density) and/or to render the slag more liquid. The slag preferably has a lower density than the collector metal. The preferred fluxing agents include sodium oxide ($Na_2O$), potassium oxide ($K_2O$) calcium oxide (CaO), calcium carbonate ($CaCO_3$), silicon dioxide ($SiO_2$), aluminium oxide ($Al_2O_3$) and magnesium oxide (MgO), or combinations of two or more thereof. Calcium oxide is especially preferred.

The process of the present invention comprises a number of steps which have been designated with roman numerals. These will now be discussed in turn.

(i) A feedstock material is fed into a plasma furnace for processing, preferably at a controlled rate. The heat of the plasma device in the furnace melts and breaks down the feedstock material. The plasma device (or devices) may be plasma torches or electrodes or a combination thereof. All references to a plasma torch(es) should be understood to be substitutable with references to an electrode(s). This results in the formation of two layers: a slag layer which may be molten and may contain solid impurities; and a molten metal layer. Due to the relative densities of these two layers, and the quiescent, non-turbulent conditions present within the furnace, the slag lies on top of the metal layer. The characteristics, such as density, of the slag can be engineered by the addition of slag-forming additives such as fluxing agents.

(ii) The slag layer is removed. The slag may be removed from the furnace via a tap hole. The slag is preferably allowed to overflow from the furnace. This allows for the use of a continuous process. This also has the advantage that the gaseous environment of the furnace can be maintained. The slag may be poured directly into a mould or storage vessel, or preferably it is removed to, or overflows onto, a cooled casting table. Various methods are known in the art for cooling the slag and fragmenting it. These include air or water cooling, direct water granulation and mechanical crushing. Depending on the composition of the slag layer it may find subsequent useful application, for example, as an additive for desulphurising steel, or as an aggregate, or in the production of an article.

(iii) The molten metal layer is removed from the furnace. This may be done by tipping the furnace or by opening a tap-hole below the level of the metal layer. It is preferred that the furnace is non-tippable as the requirement for the furnace to be tipped complicates the design of the plasma system, feed system and off-gas connections to the furnace. Such connections are susceptible to damage unless extreme care is taken during operation. Whilst efforts are made to minimise the amount of slag that is entrained within the removed molten metal layer, it is inevitable that a finite mass of slag will be associated with the metal.

Optionally, the slag may be poured into a ladle, or equivalent vessel, to transfer it from the furnace.

(iv) The molten metal from the molten metal layer is allowed to solidify. This may occur by pouring the metal into a storage vessel or mould. Preferably, however, for ease of subsequent fragmentation, the metal is poured onto a casting table and allowed to cool. In a preferred embodiment the casting table is actively cooled, for example, by liquid (water or coolant) or air cooling. A person skilled in the art would understand that other conventional methods of cooling could be used. Preferably, the coolant does not contact the metal. Indirect water cooling is the most preferred method of cooling the casting table. The molten metal is preferably formed into a thin sheet to facilitate the fragmentation process and preferably the composition of the metal is also engineered to make it brittle. Suitable sheet thicknesses are between 1 mm and 30 mm, more preferably less than 20 mm and most preferably less than 10 mm. If the sheet is less than 1 mm it is difficult to spread over the casting table. If the sheet is greater than 30 mm it is difficult to fragment.

(v) The solidified metal layer is then broken up (fragmented) to form small pieces or chips (fragments), so that segregated sections of the metal can be removed. Any entrained slag is also broken up. The chips which are produced are comprised of the precious-metal-rich composition, slag impurities, or other impurities. The more that the layer can be crushed or ground up, the greater the likelihood that slag will be displaced upon separation and, hence, the concentration and purity of the recovered precious-metal-rich composition is increased. The preferred particle or fragment produced by the fragmentation process has a diameter of less than 10 mm, preferably less than 5 mm and most preferably less than 1 mm. The preferred diameter is between 100 microns and 1 micron.

(vi) The chips or fragments comprised of the precious-metal-rich composition are separated from those fragments containing undesired material, such as slag, by means of a separation technique. Preferably the technique is magnetic separation. Other types of separation, including physical separation techniques like sifting, chemical, mineral and mesh separation and density separation may be used, preferably in conjunction with the magnetic separation. More than one of these separation methods can be adopted. The term magnetic is used here in its broadest sense and includes ferromagnetic separation and also encompasses eddy current separation.

Ferromagnetic separation may be performed by the use of a magnetic belt or a separate magnetic pick-up. The apparatus may be ferro- or electro-magnetic. Ferromagnetic separation relies on the use of a ferromagnetic collector metal. That is, iron, cobalt or nickel, or alloys thereof. If a magnetic sorting belt is used, the precious-metal-rich composition is retained on the belt and gravity causes the impurity fragments to fall away. The composition may be retrieved by precessing to a non-magnetic portion of the belt, or by scraping. Alternatively, the magnetic portion of the fragments may be lifted from a first non-magnetic belt onto an overlying magnetic belt. This leaves the non-magnetic impurities behind. Suitable apparatus for this separation would be known to one skilled in the art.

Eddy current separation is commonly used to extract aluminium from mixed ferrous and non-ferrous waste. Suitable apparatus for this purpose would be known to one skilled in the art. In an eddy current separator, a rapidly revolving magnetic rotor is positioned inside a non-metallic drum which rotates at a much slower speed. This produces flux variations at the surface of the drum, which is the drive pulley for the conveyor belt carrying the stream of mixed materials. As the conducting metallic particles are carried by the conveyor over the drum, the magnetic field passing through the particles induce currents in them. Because the particles are of random shape, the current cannot flow within them in an orderly way. The currents tend to swirl around—or eddy—within them—hence the name "eddy current".

The effect of such eddy currents is to induce a secondary magnetic field around the non-ferrous particle. This field reacts with the magnetic field of the rotor, resulting in a combined driving and repelling force, which literally ejects the conducting particle from the stream of mixed materials. This repulsion force in combination with the conveyor belt speed and vibration provides the means for an effective separation. The ejected particles which comprise the precious-metal-rich composition are retained.

As the magnetic attraction induced in ferrous metals in a mixed stream is stronger than the eddy effect it may be necessary to perform a first step of ferromagnetic separation if the collector metal is non-ferrous and there are ferrous impurities.

Other separation processes used for mineral separation such as classification, flotation and elutriation may also be used. Chemical separation processes including dissolution may also be used to separate the collector metal from the slag.

Any slag produced from separation may be combined with the slag overflow and used for other known purposes.

In one embodiment the precious-metal-rich composition may be re-used as the collector metal in the process in order to increase the concentration of precious-metals in the composition. Such a multi-pass process has the advantage that it produces a more concentrated product whilst reducing on-going processing costs, without compromising technical precious-metal recovery levels and minimising collector metal wastage. Once the precious-metals concentration in the precious-metal-rich composition reaches 10% it is necessary to dilute the reintroduced composition with more collector metal to maintain the efficiency and prevent precious-metals being lost in the slag.

In one embodiment the slag may be re-used as a precious-metal containing material in the feedstock. This recycling of the slag is optional and provides a further opportunity to extract precious-metals that would otherwise be lost from the system in the removed slag. The reintroduced slag can also act as an aid to melting.

The term 'precious-metal-rich composition' is used to indicate that the composition produced by the process of the present invention has been enriched in precious-metals. That is, it contains a greater concentration of one or more precious-metals than the feedstock that is introduced into the furnace.

As an optional further step in the process (step vii), the precious-metal-rich composition can be subjected to further refining to obtain one or more substantially pure precious-metals or an alloy containing a greater percentage by weight of one or more precious-metals.

The inventors of the present invention have surprisingly discovered that a higher rate of precious-metal recovery can be achieved through the use of a plasma torch to heat the feedstock material. In particular, the movement of the torch over the surface to ensure an even distribution of heat in the furnace contents (feedstock, slag and molten metal) improves the yield. The inventors discovered that minimising the occurrence of hot-spots and turbulence in the contents encourages separation of the precious-metals from the feedstock into the metal layer. Indeed, preferably the process of the present invention avoids hot-spots and promotes quiescent, non-turbulent conditions in the slag or metal layers. That is, the process of the present invention preferably avoids the formation of an unnecessarily super-heated zone within the furnace contents.

The formation of a superheated zone and the associated turbulence in the furnace contents, as in U.S. Pat. No. 4,685,963, results in loss of platinum-group-metals into the gas phase, through the formation of volatile oxide and chloride species. This compromises the technical recovery rates.

Furthermore, plasma heating of the slag layer results in a reduction in the slag volume. This may involve an increase in the density of the slag. The slag volume is also minimised by the reduced amount of slag additives introduced in the feedstock for fluxing. The additives preferably comprise between one part in four and one part in ten, and most preferably one part in six by mass of the feedstock. Having a reduced volume of slag surprisingly also reduces the precious-metal content of this layer. In the conventional submerged arc furnaces of the prior art, because of the relatively large mass of slag developed and the batch mode of operation, recovery efficiencies are low and a lot of precious-metals are lost to the slag. The submerged arc cannot be precessed over the slag to distribute the heat.

Furthermore, the use of a more uniform heating of the furnace contents allows for the use of a continuous treatment process. The process is continuous in that the plasma torch or torches may be kept running continuously, heating the contents of the furnace. As the level of the material in the furnace increases, the slag overflows from the furnace whilst the metal layer increases in volume. Once there is sufficient metal in the furnace, the metal is tapped off from the bottom of the furnace. More feedstock can then be introduced to replace the material tapped off from the furnace until the slag level reaches a sufficient level, for example, the point of overflow and the process can be repeated. Hence, whilst the amount of material in the furnace varies, the process is cyclically continuous and the plasma torch can be kept running. The metal is preferably removed from the furnace in batches. Alternatively, in a less preferred embodiment, the metal can also be removed as a constant flow.

The use of a continuous process removes the need to allow the furnace to cool between batches. The furnace design for the continuous process avoids the problem of the development of a stagnant zone. Furthermore, as the plasma torch is kept running the molten metal layer remains molten as it is removed from the furnace, preventing unwanted plugging of the tap valve. The continuous running of the plasma torch means that the furnace does not lose heat and no energy is wasted bringing the furnace back up to temperature. This saves energy, allows for higher overall processing yields (i.e. amount of feedstock processed) and/or allows for the use of higher residency times.

The present inventors have discovered that the recovery rate of the process can be analysed as a phase partitioning/distribution phenomenon. Optimised recovery rates may be produced by the in-situ formation and/or dispersion of a uniformly heated layer of slag and of the molten collector metal. This leads to a higher yield than conventionally results from using a high intensity, focused heat source and produces a melt of uniform fluidity. The partitioning of the precious-metals can be achieved by selection of suitable feedstock ingredients, careful heating, an awareness of the phases to be produced and their associated interaction. That is, depending on the desired precious-metal(s) the selection of the collector material, temperature and any further additives may be finely tuned.

A measure of the phase partitioning is given by the partitioning/distribution coefficient (P). This provides a measure of the efficiency of the extraction process. In this context, $$P = \frac{\text{[Concentration of precious} - \text{metals in the collector metal]}}{\text{[Concentration of precious} - \text{metals in the slag]}}$$

The collector metal in the above formula corresponds to the molten metal layer. The partitioning/distribution coefficient, which can be measured for each metal or averaged over the precious-metals is preferably greater than 400, more preferably, greater than 800 and, most preferably, more than 1500. Practical investigation of the platinum-group-metal content of the layers is required to determine the concentrations and this may be done by conventional chemical analysis methods that would be known to one skilled in the art. Rigorous determination of a distribution coefficient would also provide this data given the composition of one layer.

Preferably the plasma torch, where it is focused on the feedstock material, produces a heat of greater than 1000° C. This minimum temperature is required to fully melt the substrate of the precious-metal-containing material. The temperature is more preferably between 1100° C. and 2000° C. and most preferably between 1200° C. and 1600° C. The applied heat helps to keep the contents of the furnace molten whilst reducing boiling and violent convection currents in the layers formed in the furnace. This improves settling of the precious-metals into the collector metal and improves technical recovery rates.

The plasma device used in the process and apparatus of the invention may be a plasma torch or a graphite electrode. In one embodiment there is more than one plasma device used and these may each independently be a torch or an electrode. It would be understood by one skilled in the art that where plasma torches are referred to in this description electrodes could be substituted. Plasma torches are preferably used in all embodiments.

The plasma torches used in the process of the present invention serve to heat and melt the contents of the furnace. There may be one or more torches used. If a single torch is used it may preferably be precessed over the surface of the furnace contents. In particular it is preferred for the torch or torches to be precessable and adjustable in all three dimensions. This allows for even heating and encourages uniform heating and fluidity of the contents whilst maintaining the metal layer in its molten form. This improves separation.

In one embodiment the apparatus may comprise both a duty plasma torch and, optionally, one or more stand-by torches. The use of a number of torches allows for improved reliability, operability and maintainability. If more than one torch is used then these may be fixed or moveable. In particular, torches which are adjustable in precessing angle and height are preferred.

The plasma torch may be operated in either transferred/non-transferred arc modes. Most preferably a transferred arc; this means that the arc is electrically transferred to the work piece, which is energetically more efficient. The arc passes from the cathode through the nozzle orifice to the anode as it represents the path of least resistance. The torch can be direct current, alternating current at mains frequency, or at radio frequency; as such they are known as dc, ac or rf torches, respectively. The preferred plasma gas is argon or any other inert gas. Other gases may be added to the plasma gas to improve thermal efficiency and to modify the arc chemistry.

The furnace chamber can be a conventional furnace as known in the art. Preferably, however, the furnace is indirectly water-cooled with a working hot-face refractory lining. The furnace shell may be made primarily of steel with copper heat sinks and/or refractory metals especially in the higher temperature regions. The furnace external surface is preferably cooled to result in a temperature profile that results in the formation of an internal protective crust/skull which minimises refractory material wear. The cooling may be performed with water or another coolant including air. Preferably the furnace is adapted for use with a fully adjustable plasma torch or torches.

Residence times are important in extracting precious-metals from precious-metal-containing materials. Preferably the materials are held within the furnace for no less than 5 minutes, more preferably 20 minutes and most preferably 30 minutes or more. Longer residence times lead to slightly higher recovery rates, although this is offset by the lower rate at which feedstock can be processed. In order to obtain a good through-put a maximum residence time of one hour is preferred.

The conditions within the furnace may be oxidising or reducing. They are preferably reducing conditions as this improves the rhodium and palladium technical recovery rates. Reducing conditions are encouraged by the inclusion of carbon in the feedstock. This may be as an additive or as part of the precious-metal-containing material.

In a preferred embodiment the furnace is run at a negative pressure. This minimises the amount of off-gas dust from physical and/or chemical carry-over mechanisms, minimises the level of air ingress and also ensures reducing conditions. These maximise palladium (Pd) recovery rates, which are usually otherwise compromised by oxidative losses. The pressure is preferably less than 1 Pa, more preferably between 1 Pa and −45 Pa, most preferably −25 to −35 Pa, ideally −30 Pa.

In conventional furnaces, high negative pressures are used of about −300 Pa. As a result, a large amount of platinum-group-metal is lost from the surface of the slag into the off-gas system. Whilst some of this may be retrieved as dust from filters, this requires cleaning of the filters and reduces the concentration of the precious-metals in the composition of the collector metal of the present invention.

The casting table used in the present invention provides a smooth surface on which the molten metal layer with entrained slag can cool. The slag that is collected from the furnace separately, preferably by overflow, may either be cooled on a casting table or directly water-cooled. The casting table may be suitably sized and dimensioned to allow for the formation of a preferred size of product. The casting table may be actively or passively cooled. It is preferred that the metal layer and/or the slag is solidified through the use of active cooling. Fast cooling results in residual material stress and associated brittleness for ease of fragmentation. A preferred initial cooling rate is greater than 200° C./s, more preferably greater than 300° C./s. This is the case for the cooling of the molten metal layer and/or the slag layer.

In one embodiment the apparatus comprises an optional off-gas system design for treating all emissions, in order to allow compliance with environmental emissions thresholds as determined by the on-line CEMS measurement system.

Preferably, the off-gas system comprises one or more of the following:

- a thermal oxidiser, complete with packaged modulating gas burner and solids drop-out point, capable of raising the temperature of the furnace gas, plus sufficient air to give 6% oxygen content, to a temperature of >850° C. for more than two seconds. More preferably more >1100° C. for more than two seconds.
- a fan for the dilution air, complete with frequency inverter, to control the addition of dilution air in order to maintain the temperature of the gas at the filter at 400° C. Alternatively, waste heat recovery systems could be used, such as waste heat boilers.
- a high temperature filter, using ceramic filter elements, to remove the solids from the gas stream and equipped with phased, off-line, reverse pulse cleaning.
- a high temperature ID fan, complete with inverter control, to draw all the furnace off-gas through the off-gas treatment system.
- a stack designed in line with the D1 methodology.

a motor control panel including three frequency inverters.

a powder feed system to accept bagged, activated carbon, lime or sodium bicarbonate and to meter it into the process for the sorption of acid gases and heavy metal species.

as a subsequent option (to reduce NOx emissions), a system to accept a NOx reactant and to meter it into the process. This is typically referred to as Non-catalyst Selective Reduction (NCSR).

In a preferred embodiment the feedstock material is subjected to a pre-treatment. This pre-treatment may be at least one of any of the following. Each may be performed individually or in combination with any of the other steps and in any order. A preferred order is that shown by the numbering.

1. Sorting and Grading

Initial treatment to remove objects which do not contain precious-metals, for example, plastics and rubber included in auto-catalyst units, may be performed. Objects having a size in excess of 20 mm or more may also be removed.

2. Shearing and/or Shredding

Shearing and/or shredding are highly preferred steps. These are carried out to reduce the average particle size and to recover the precious-metal-containing component of the waste. They can also be used to blend waste from different sources. These steps make the treatment process more effective.

3. Screening

The material may be mechanically screened to select particles with sizes within a given range. For example, the given range may be from less than 20 mm, more preferably less than 10 mm.

4. Blending

The precious-metal-containing material can be selected and blended with fluxing agents, collector metal and/or collector metal forming materials, in order to obtain a preferred mix of precious-metals in the produced composition. This may be done by mixing a particularly rich source of precious-metals with a poorer one to provide a consistent/homogeneous feedstock. Alternatively, blending may be performed to favour the extraction of a composition that is particularly rich in one or more precious-metals.

In a preferred embodiment the precious-metal-containing material is subjected to a pre-concentrating treatment. This is especially preferred when the precious-metals are present in an amount less that 100 ppm, and even more preferred when less than 30 ppm. If the precious-metals are present in an amount greater than 300 ppm then pre-concentrating is not necessarily required. Wastes having more than 10% precious-metals are not commonly pre-treated. There are a number of techniques for pre-concentrating the precious-metals which would be known to one skilled in the art. These include incineration, standard pyrometallurgical smelting, hydrometallurgical dissolution of the matrix, or the selective leaching of the precious metals.

1. Incineration methods would be known to one skilled in the art. Metal particles can be retained in the ash produced after combustion of a starting material and used at least as part of a feedstock material.

2. Pyrometallurgical smelting, is a form of extractive metallurgy. The main use of smelting is to produce a metal from its ore. This includes iron extraction from iron ore usually in the form of iron oxides such as haematite or magnetite, copper extraction and the extraction of other base metals from their oxides obtained from the roasting of their sulphide ores. It makes use of a chemical reducing agent, commonly a fuel that is a source of carbon, such as coke, or in earlier times charcoal, to change the oxidation state of the metal contained in the oxide. The carbon, or carbon monoxide derived from the carbon, removes oxygen from the oxide to leave the metal. The carbon or carbon monoxide is oxidized, producing carbon monoxide and/or carbon dioxide. As most ores are impure, it is often necessary to use a flux, such as lime, calcium oxide, to remove the accompanying oxide and sulphide impurities as a slag.

3. Hydrometallurgical dissolution involves dissolving the precious-metals in aqua regia to form their respective chloride salts. Salts of the precious-metals can be formed by substitution reactions, and these salts are ultimately reduced to the elemental metal using hydrogen.

For example, rhodium sulphate can be separated after the salts have been melted together with sodium hydrogen sulphate and leached with water. The residue can then be melted together with sodium peroxide, which dissolves all the metals except iridium. Any ruthenium and osmium form tetroxides after chlorine has been added to solution. The osmium tetroxide can then be dissolved in alcoholic sodium hydroxide and separated from any ruthenium tetroxides.

Hydrometallurgical recovery of precious-metal wastes, tends to be a home-grown, low capital entry technology with poor technical recovery rates. Hydro-metallurgical/chemical procedures are known as the sole step in a method for extracting platinum-group-metals from waste automotive catalysts. A significant chemical characteristic of dissolved platinum-group-metals is that the ions are strong oxidants, easily reduced to metal, and easily hydrolysed. Thus, they tend to precipitate and deposit in undesirable locations, and this can make development of a robust, controllable process difficult.

4. Selective leaching converts metals into soluble salts in aqueous media. Compared to pyrometallurgical operations, leaching is easier to perform, but even though it has no gaseous pollution associated with it, it is challenged by the management of liquid effluents that arise. The main drawback of leaching is its lower efficiency caused by the low temperatures of the operation, which dramatically affect chemical reaction rates. Leaching may be carried out by irrigating a material with a dilute cyanide solution that percolates through the ore to dissolve the metals, for example gold and silver. The solution containing gold and silver exits the base and is collected so that the precious metals may be extracted.

The invention will now be discussed in combination with FIGS. 1 and 2, through the description of a particular embodiment of the apparatus. Each and every feature of this embodiment can be used in isolation from, or together with, any of the features set out in the description. While the following description refers to platinum-group-metals, it should be appreciated that the same process and apparatus can be used for recovery of all precious metals.

FIGURES

The present invention will now be described further with reference to the accompanying drawings provided by way of example, in which.

The present invention will now be further described. In the following passages different aspects/embodiments of the invention are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Figure 1:
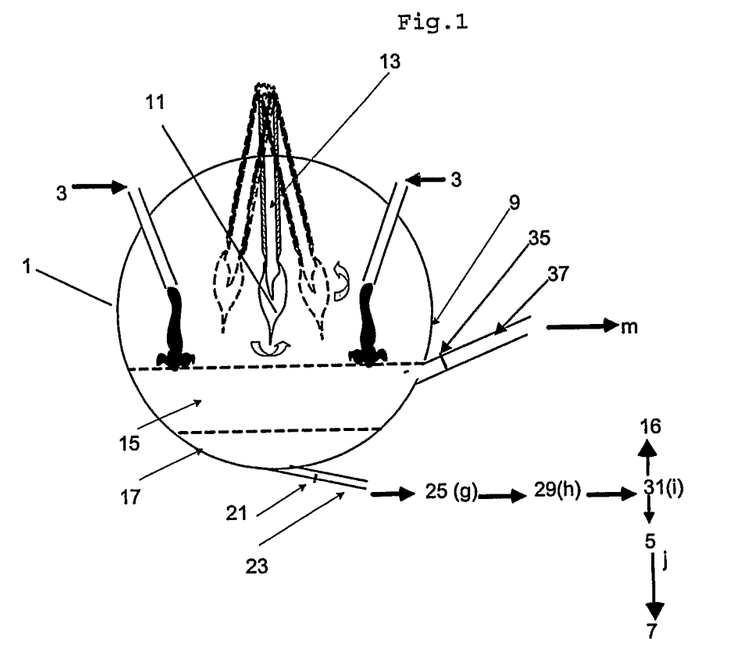
FIG. 1 is a diagram of the apparatus of the present invention.
Figure 2:
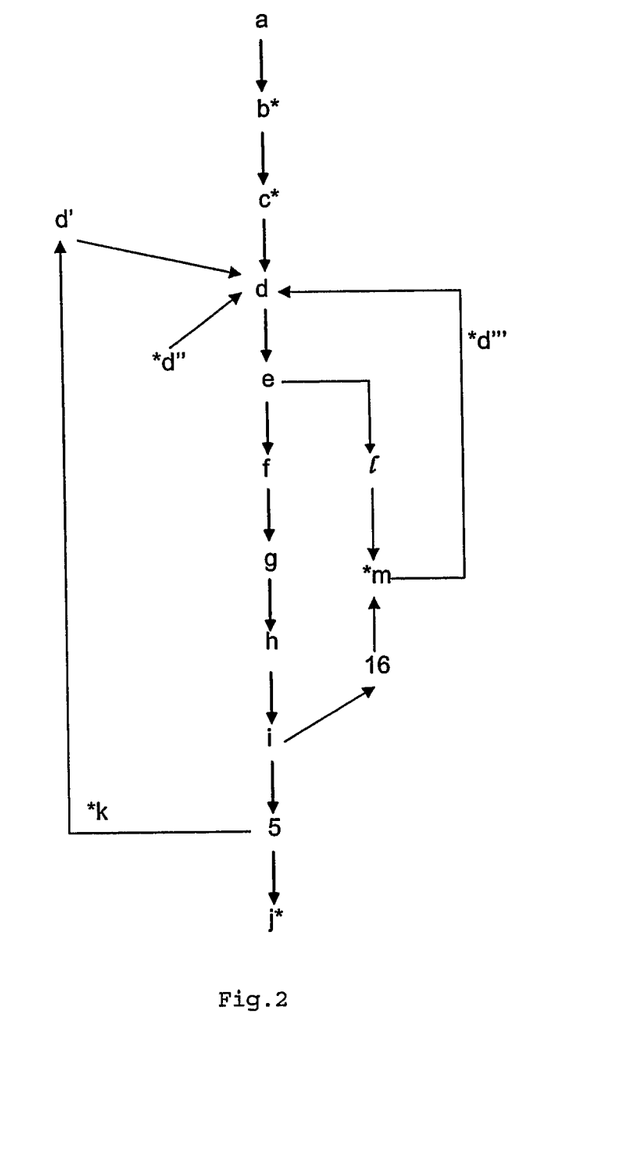
FIG. 2 is a flow chart describing the process of the present invention.

FIG. 1 shows an apparatus 1 for the treatment of a waste feedstock 3 to recover a precious-metal-rich composition 5. This allows for the production of refined precious-metals 7. FIG. 2 shows the primary process steps involved in the recovery of precious metals. Those steps marked with an asterisks are optional. These steps are:
a) obtaining a feedstock material, such as autocatalyst waste;
b) preliminary treatment of a feedstock material 3, such as sorting or picking;
c) pre-concentrating of the precious metals in the feedstock material 3;
d) introducing the feedstock 3 into a furnace chamber 9;
d') introducing a collector material 10 into a furnace chamber 9;
e) treating the feedstock 3 with plasma 11 from a plasma device, such as a plasma torch 13. This causes the formation of a slag layer 15 of slag 16 and a molten metal layer 17. The molten metal layer comprises precious metals 7 and the collector material 10;
f) the molten metal layer 17 is removed from the furnace chamber 9 via a tap valve 21 near the base of the furnace chamber 9. The molten metal layer 17 flows down a collection chute 23 to a casting table 25;
g) the molten metal layer 17 is allowed to cool on the casting table 25 to form a metal layer 27 (not shown);
h) the metal layer 27 is fragmented in a crushing apparatus 29;
i) a recovery step (optionally magnetic recovery) is carried out in a recovery apparatus 31 to separate the fragmented metal layer 27 into slag 16 and a precious-metal-rich composition 5;
j) a further refining step is carried out to obtain the precious metals 7.

Steps b, c and j are optional. Further steps which may optionally be included are:
k) recycling the precious-metal-rich composition 5 into the furnace chamber 9;
d") introducing additives 33 (not shown) into a furnace chamber 9;
d''') introducing slag 16 into a furnace chamber 9 for reprocessing;
l) collecting slag 16 overflowed from the furnace chamber 9 during continuous processing. The slag 16 leaves the furnace 9 by a tap valve 35 which forms a slag overflow 37;
m) treating the slag 16.

In a specific embodiment, feedstock 3 was fed into a plasma-torch furnace 9 and heated to produce a slag layer 15 overlying a metal layer 17. The metal layer 17 comprised the collector material 10 together with platinum-group-metals 7' extracted from the platinum-group-metal-containing feedstock 3. The slag layer 15, which comprised impurities, was removed from the furnace chamber 9 by a continuous overflow method over an overflow 37. The slag 16 was subsequently cooled (g) and crushed (h).

The combined platinum-group-metals 7' and collector metal 10 were removed from the furnace 9 from a lower tap hole 21 in order to reduce the amount of slag 16 that was entrained. The furnace 9 was designed to allow slag 16 to overflow continuously from an overflow tap-hole 35. Under normal circumstances the overflow tap-hole 35 had a protective cover over it, which could be swung out of the way for ease of access during inspection and tapping. The slag tap hole 35 could be sealed with ceramic wool and slag, which would have frozen in the tap hole 35. The slag 16 was best cleared out by an oxygen lance. The lancing process continued until constant molten flow was established and the temperature of the slag had stabilised. Note that because the plasma arc of the plasma torch 13 was still running during tapping, both the furnace 9 and the lancing rod were connected to earth. The first material to be tapped was poured into a suitable slag bin, but once a steady flow had been established, the slag 16 was poured onto a water cooled slag conveyor, or water based slag granulation system, for ease of further processing. Tapping operations were carried out with the plasma on to ensure that heat was supplied to the furnace 9, and therefore the fluidity of the slag 16 and metal, were maintained.

The lower tap-hole 21 was used to tap the metal from the furnace. It was sealed with tap-hole clay. Once feeding had stopped a ceramic wool blanket was inserted into the overflow tap-hole; the keeper was removed from the lower tap-hole and an oxygen lance was used to burn through the clay plug to the molten metal in the furnace. Once a full bore flow of metal had been achieved, the oxygen lance was removed. The molten metal and slag impurities ran out of the furnace into a refractory lined ladle of the kind typically used in foundries. The ladle was pre-heated using a gas burner specially designed for the task and was moved using a fork-lift truck. Once the furnace 9 had delivered its yield of metal and slag, the tap-hole 21 was cleaned thoroughly. The plant attendant quickly plugged the tap-hole 21 with clay and installed the keeper. Feed was restored at a nominal rate as soon as the tap-hole 21 was made safe.

The collector metal 10 and the alloyed platinum-group-metals 7' were poured onto a casting table 25 to produce a layer of metal 27 that was 5-10 mm thick. As a discrete mass of slag 16 impurity was intermixed with the collector metal 10 on exiting the furnace 9, it was necessary to crush/grind (h) and magnetically recover (i) the entrained metal prills as a 'magnetic fraction'. The collector material 10 was engineered to be brittle to facilitate crushing and grinding (h), which was required both for representative sampling and final refining. The majority of the slag 16 exited the plasma furnace 8 in isolation from the collector metal 10.

A portion of the metal prills were re-introduced into the furnace (k) in a multiple-pass processing regime to increase the percentage by weight of platinum-group-metals 7' collected. The platinum-group-metal-rich composition 5' was then refined to obtain pure platinum-group-metals 7'.

The invention will now be shown in the following non-limiting example.

EXAMPLE 1

A plasma arc furnace with a shell diameter of 1.5 metres and an inner diameter of 1.5 m was heated using a transferred-arc plasma torch with precessive torch motion control provided by a six-axis robotic manipulator. By this means, the working end of the torch followed a truly circular monition at a constant fixed depth from the furnace roof. The integrated processing system was computer controlled from a Supervision Control and Data Acquisition (SCADA) interface and was used to process 2.792 tonnes of monolithic automotive catalyst at a rate of 250 kg/hr catalyst. The representative speciated platinum-group-metal analysis of the catalyst material was as follows:

| Catalyst FIBC Number | Catalyst monolith (kg) | Cumulative Total (kg) | Pt (mg/kg) | Pd (mg/kg) | Rh (mg/kg) |
|---|---|---|---|---|---|
| RIBC 1 Bag 1 | 505.86 | 505.9 | 448.5 | 462 | 118 |
| RIBC 2 Bag 3 | 446.53 | 952.4 | 521.5 | 493 | 132.5 |
| RIBC 1 Bag 2 | 491.45 | 1443.8 | 458.5 | 602.5 | 124.5 |
| RIBC 2 Bag 4 | 474.70 | 1918.5 | 1177.5 | 255 | 211.5 |
| RIBC 1 Bag 5 | 502.65 | 2421.2 | 1141 | 238.5 | 200 |
| RIBC 2 Bag 6 | 371.40 | 2792.6 | 1200 | 708 | 201 |

It can be determined that 2.26 kg Pt, 1.25 kg Pd and 0.46 kg Rh were charged to the furnace. This waste material was blended so that the catalyst content, without divulging the bulk oxide composition, represented 79.7% of the blend. The balance was 12.3% flux, 3.3% magnetite and 2.7% carbonaceous reductant. Therefore, in total, 3504 kg of blended feed was charged to the furnace. The process employed a precessing plasma torch to maintain the plasma smelter at an internal temperature of between 1400-1600° C. The system was operated on the basis of a Theoretical Energy Requirement (TER) of 948.5 kWh/tonne, and when system thermal losses were allowed for, this gave rise to a gross plasma power requirement of 439 kW when processing at 300 kg/hr of blended material.

The plant was operated for 29 hours and delivered 3347.1 kg slag, 126.96 kg collector metal, 92.8 kg of magnetically recovered material and 75.3 kg of filter system dust. These values represent 99.5%, 3.6%, 2.6% and 2.1% of the original blend mass charged to the furnace, respectively. The dust mass was disproportionately high as it included the $Ca(OH)_2$ sorbent mass charged to the off-gas system during processing to abate acid gas, i.e. $SO_2(g)$, emissions. The sorbent material was delivered at 0.85 kg hr$^{-1}$. Furthermore, refractory and/or system cross-contamination accounted for the slight excess of 100% mass accountability. The speciated platinum-group-metal analyses and platinum-group-metal mass content of the collector metal product were as follows:

| | PGM Assay (mg/kg) | | | PGM Mass (kg) | | |
|---|---|---|---|---|---|---|
| | Pt | Pd | Rh | Pt | Pd | Rh |
| PGM Collector | 12665.00 | 7702.50 | 2697.50 | 1.607948 | 0.977909 | 0.3424746 |
| PGM Dust | 739 | 698.5 | 5.1 | 0.055647 | 0.052597 | 0.000384 |
| Magnetically Recovered | 5682.50 | 2382.50 | 1096.50 | 0.527336 | 0.221096 | 0.1017552 |

The technical platinum-group-metal recovery rate was calculated by determining the mass fraction of the speciated platinum-group-metals in the tradable product phases as a fraction of the net input, i.e. platinum-group-metal content of the catalysts feed minus the platinum-group-metal content of the dust. On this basis the technical recovery rates are determined to be 96.9% Pt, 99.9% Pd and 96.7% Rh. The internal configuration of the furnace is designed to minimise containment material wetting and infiltration as well as refractory dissolution. The overflow slag phase platinum-group-metal composition analysis was as follows:

| | PGM Assay (mg/kg) | | | PGM Mass (kg) | | |
|---|---|---|---|---|---|---|
| | Pt | Pd | Rh | Pt | Pd | Rh |
| Slag | 12.85 | 9.6 | 3.355 | 0.04301 | 0.032132 | 0.0112295 |

Slag based recovery rate calculation:

$$\text{Slag Recovery Rate (\%)} = 1 - \left(\frac{M_{Slag} \times [PGM_{Slag}]}{M_{autocat} \times [PGM_{autocat}]}\right) \times 100$$

Where:
$M_{Slag}$=Slag mass (kg)
$M_{autocat}$=Auto-catalyst ceramic mass (kg)
$[PGM_{Slag}]$=platinum-group metal concentration in the slag
$[PGM_{autocat}]$=platinum-group metal concentration in the auto-catalyst This gave slag based, technical recovery rates of 98.1% Pt, 94.4% Pd and 97.5% Rh.

The partitioning/distribution coefficient for the platinum-group metal species was calculated as follows:

$$\text{Patitioning Coefficient} = \frac{\left(\frac{\text{Mass of } PGM \text{ in Metal Collector}}{\text{Overall mass of } Collector}\right)}{\left(\frac{\text{Mass of } PGM \text{ in Slag}}{\text{Overall Mass of Slag}}\right)}$$

Therefore for this heat the blend platinum-group-metal coefficient equals 893, and the coefficients for Pt=985, Pd=802 and Rh=804. This catalyst material came from the USA; however, for domestic UK catalysts, without divulging phase identity and/or composition, the partitioning coefficient values observed typically were:

| Partitioning Coefficient/Heat Number | Blended | Pt | Pd | Rh |
|---|---|---|---|---|
| 1 | 338.9 | 262.1 | 484.8 | 506.3 |
| 2 | 445.3 | 429.1 | 452.5 | 502.9 |
| 3 | 784.1 | 645.5 | 920.0 | 1225.6 |
| 5 | 404.1 | 342.1 | 467.6 | 530.5 |
| 6 | 509.3 | 509.0 | 529.0 | 449.7 |
| Average | 496 | 438 | 570 | 642 |

What becomes very clear is that the relative phase masses and starting/target platinum-group-metal concentrations of the resulting phases are very important considerations in designing the process.

EXAMPLE 2

The process of example 1 was carried out to recover gold and silver in addition to platinum-group-metals. The results are summarised in the below tables. All PMs feedrate units in the table are grams/h; all other streams are kg/h.

TABLE A

Feedstock composition.

| Streams | Sweeps | Catalysts | Copper | EF Flux | Input prepared | Excess Feed | Net input |
|---|---|---|---|---|---|---|---|
| Feedrate (kg) | 18.90 | 11.40 | 9.00 | 9.80 | 49.10 | 2.10 | 47.00 |
| PMs content (g) | 1,895.86 | 38.78 | 830.52 | 0.00 | 2,765.16 | 118.27 | 2,646.90 |
| Ag | 1,559.63 | 0.00 | 744.75 | 0.00 | 2,304.38 | 98.56 | 2,205.82 |
| Au | 8.69 | 0.00 | 14.31 | 0.00 | 23.00 | 0.98 | 22.02 |
| Pt | 140.24 | 22.87 | 8.46 | 0.00 | 171.57 | 7.34 | 164.23 |
| Pd | 175.01 | 15.61 | 63.00 | 0.00 | 253.62 | 10.85 | 242.77 |
| Rh | 12.29 | 0.31 | 0.00 | 0.00 | 12.59 | 0.54 | 12.05 |

TABLE B

Compositions recovered.

| Streams | Recovered Alloy | Recovered Slag | Lost Dust | Gas | Output total |
|---|---|---|---|---|---|
| Feedrate (kg) | 10.02 | 27.27 | 0.97 | 1.7 | 39.92 |
| PMs content (g) | 1,621.34 | 0.86 | 140.6 | | 1762.85 |
| Ag | 1,239.87 | 0.49 | 135.80 | | 1,376.17 |
| Au | 22.04 | 0.00 | 0.06 | | 22.10 |
| Pt | 139.78 | 0.03 | 1.79 | | 141.60 |
| Pd | 215.13 | 0.34 | 2.98 | | 218.45 |
| Rh | 4.51 | 0.00 | 0.02 | | 4.53 |

TABLE C

Recovery rates.

| Streams | Balance (g) | Balanced (wt %) | PMs' recovery (%) | PMs' loss to slag (%) |
|---|---|---|---|---|
| Feedrate (kg) | −7.08 | −15.06% | | |
| PMs content (g) | −884.05 | −33.40% | | |
| Ag | −829.65 | −37.61% | 56.21% | 0.02% |
| Au | 0.08 | 0.37% | 100.11% | 0.00% |
| Pt | −22.63 | −13.78% | 85.11% | 0.02% |
| Pd | −24.33 | −10.02% | 88.61% | 0.14% |
| Rh | −7.52 | −62.39% | 37.41% | 0.00% |

The following table summarises the unique advantages of the applicant's plasma enhanced smelting technology (plasma recovery) with respect to other generic competing techniques:

| | SAF Recovery | Hydrometallurgical Recovery | Plasma Recovery |
|---|---|---|---|
| Relative Capital expenditure | High | N/A (bespoke plants) | Medium |
| Relative Operational expenditure | High | High | Low |
| PGM Recovery Rate (%) | 92-96 | 85-90 | >98 |
| Operation | Batch | Batch | Continuous |

One particular benefit of the present invention is the very good recovery rates for rhodium (Rh) which are normally very low; in particular, when extracted using conventional submerged-arc furnace separation techniques.

Figure 3A:
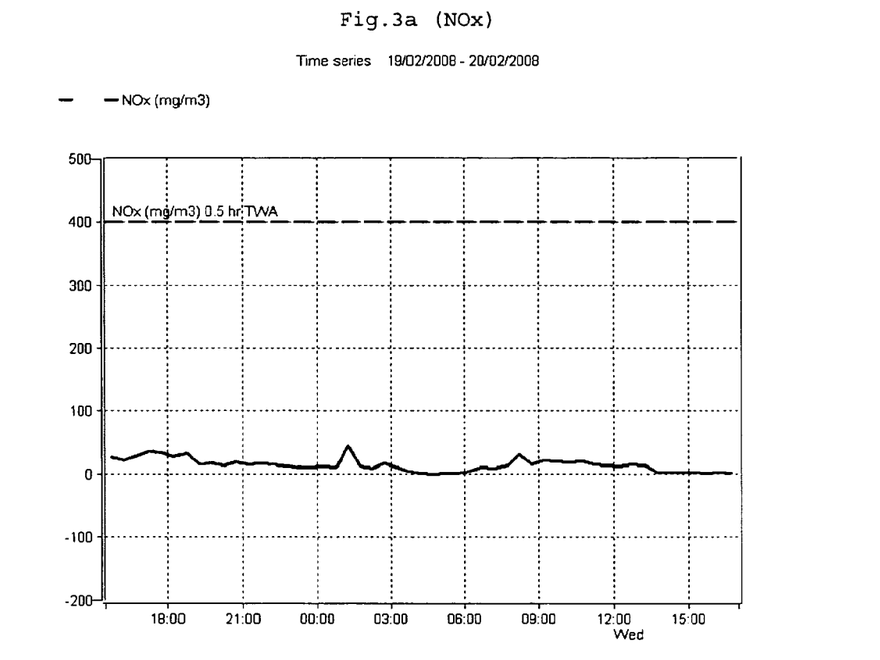
FIGS. 3a and 3b show emissions data from the process.
Figure 3B:
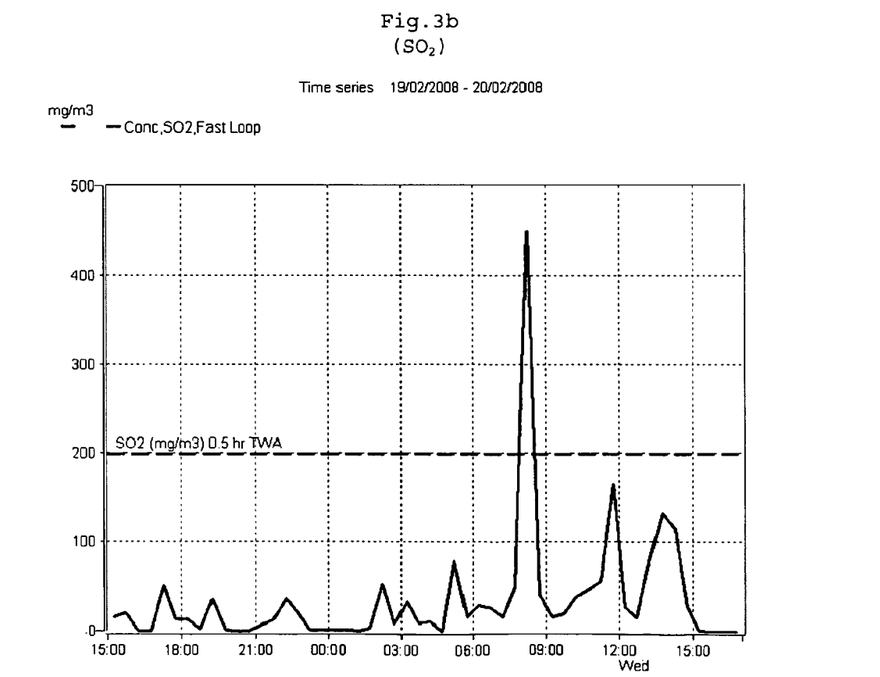

The emissions will now be assessed on the basis of best standards for small thermal plant and the Waste Incineration Directive (WID). From an emissions standpoint CO(g) emissions were stable and demonstrated compliance throughout the heat at 13.41 mg/m$^3$. For NOx(g) almost complete compliance was observed whilst processing material, and emissions remained stable over the entire heat. Similarly the SO$_2$(g) emissions were sustained at a low level and the operation of the lime feeder was sustained. SO$_2$(g) levels were observed to show an exceedance of 1.72% in compliance with Agency requirements. These are illustrated in FIGS. 3a and 3b.

Metallographic Analysis

The structure of the solid solution platinum-group metal-rich composition produced in the above example 1 was metallographically analysed in the following way.

A button of collector metal, 31 mm in diameter and 9 mm thick in the centre, that had been chill-cast on a water-cooled steel casting table, was sectioned diametrically, mounted in conducting bakelite, ground and polished to a 1 μm diamond finish, then etched in a 2% solution of nitric acid in methanol (nital) solution to reveal the microstructure.

The specimen was examined optically using a Polyvar Met microscope with a Polaroid™ DMC2 digital camera. Micrographs were taken at 100× and 500× magnification.

The specimen was then examined on a JEOL 840A SEM with an attached PGT Imix energy dispersive X-ray analysis system (EDS). An accelerating voltage of 15 kV was used for the majority of the analyses but elemental distribution maps were collected using an accelerating voltage of 25 kV to allow the use of the platinum L radiation. This avoided the use of platinum M which overlaps with phosphorus K radiation, however, the distribution maps based on phosphorus K contain a contribution from platinum L.

Figure 4:
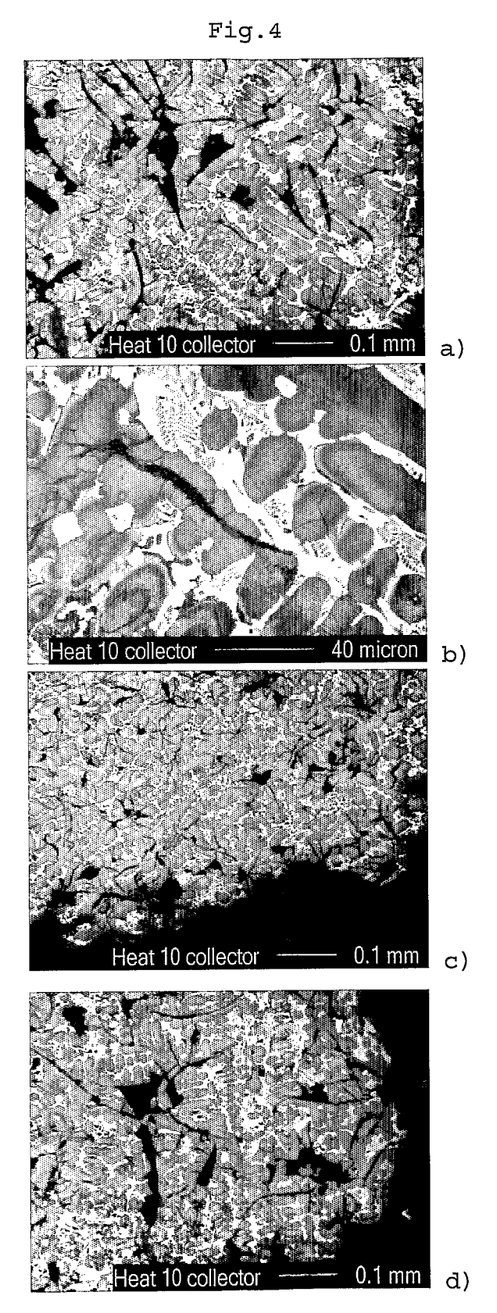
FIG. 4 shows optical micrographs of a sample rich in platinum-group-metals, showing the microstructure of different regions of the sample, the four individual micrographs showing a) central region; b) detail of a); c) base; d) base-edge surface.

FIG. 4a shows a central region typical of the overall microstructure of the specimen. The microstructure comprises graphite flakes (black), which appear to have a 'kish' form typical of hypereutectic cast irons, around which has formed a dendritic phase (dark grey) and an interdendritic phase (light grey).

Figure 11:
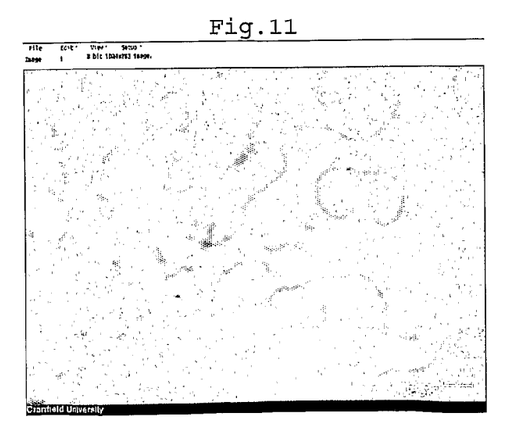
FIG. 11 shows veining or possible segregation effects in the iron-rich phase.

At higher magnification, FIG. 4b, the graphite flake is completely surrounded by the dark grey etching phase which contains some internal veining, possibly from a cellular solidification structure; see FIG. 11. At first sight this phase was assumed to be irresolvable pearlite, but is actually an iron solid solution, probably austenite, but possibly ferrite. The interdendritic phase exhibits a typical ledeburitic eutectic structure characteristic of a chill-cast white iron. Later analysis revealed this light grey phase was the iron-carbon-iron phosphide eutectic, steadite.

The base region, FIG. 4c, which would be expected to have had a higher cooling rate, exhibits a slightly finer graphite structure and marginally less interdendritic eutectic. The microstructure in the free corner region, FIG. 4d, is similar to that in FIG. 4a. Overall there are no major changes in microstructure throughout the specimen.

This is an unusual microstructure because it appears to contain primary graphite rather than cementite although it has been chill cast. The likely solidification sequence was 1) graphite, 2) iron solid solution, 3) eutectic.

Cast irons can be difficult to prepare and there is evidence of loss of graphite from the surface with the resultant holes being filled with polishing debris. However, despite these artefacts the micrographs are representative of the microstructure.

Figure 5:
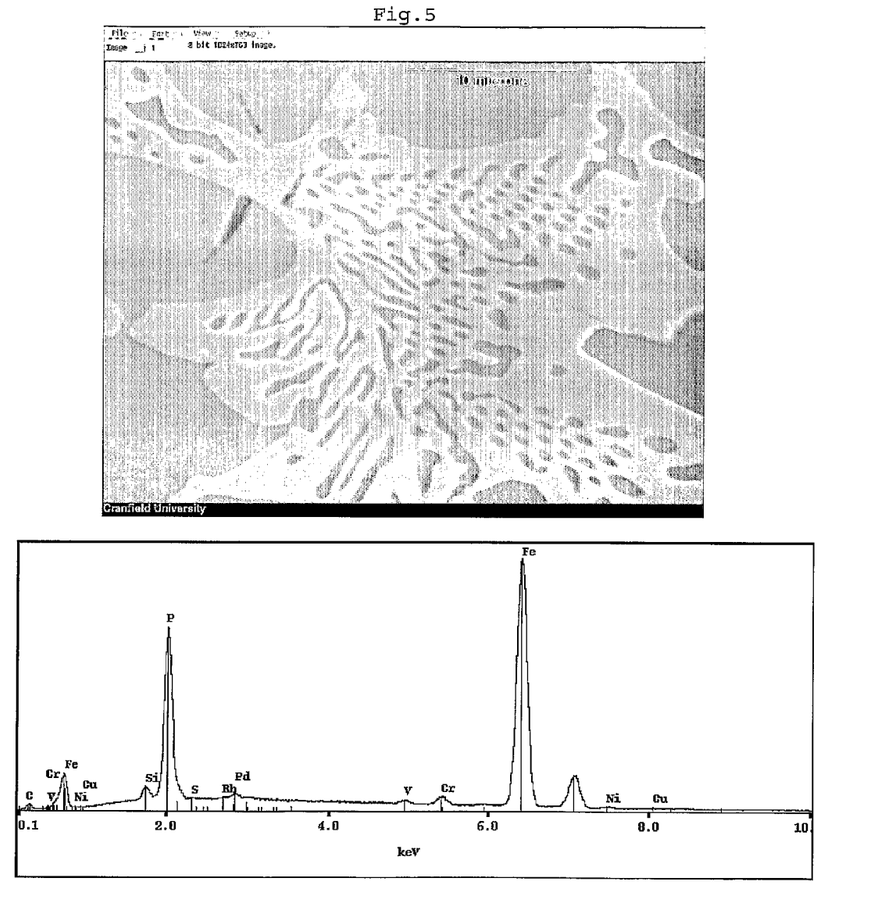
FIG. 5 shows the typical microstructure of the steadite eutectic and associated Energy Dispersive X-ray Spectrometry (EDS) analysis.

FIG. 5 shows the typical microstructure of the steadite eutectic and associated EDS analysis. The latter shows it to contain mainly iron and phosphorus with small quantities of other elements in solution.

Figure 6:
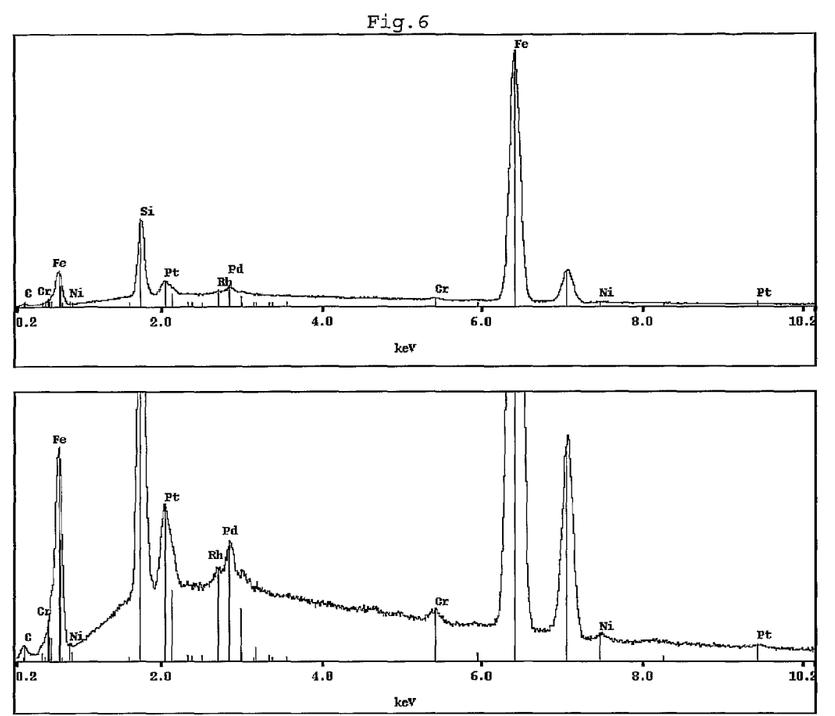
FIG. 6 shows EDS analysis of the iron-rich solid solution adjacent to the steadite in FIG. 5, where the lower figure is an expanded version of the upper figure.

FIG. 6 comprises two graphs. The latter is an expanded version of the former. The figure shows the chemical analysis of the adjacent iron-rich solid solution. This phase contains a high concentration of silicon which is a ferrite stabiliser and also a promoter of graphite formation. The platinum metals are in solution in this phase at a greater concentration than in the steadite. Despite its high silicon content it would be expected that this phase is austenite. This is because there is carbon present which, weight for weight, acts as a more powerful austenite stabiliser than silicon which acts as a ferrite stabiliser. The platinum metals are also austenite stabilisers and there is an absence of any transformation structure in this phase as would be expected from the rapid cooling rate (carbon would have to be rejected from the austenite to form martensite, bainite, or pearlite). It is unlikely for ferrite to be in direct contact with graphite without some cementite being present in the vicinity, hence, the most likely explanation of this phase is that it is retained austenite owing to a high carbon content. The internal veining of this phase as seen in FIG. 4b, is also indicative of that this phase is a solid solution probably in a metastable condition.

Figure 7:
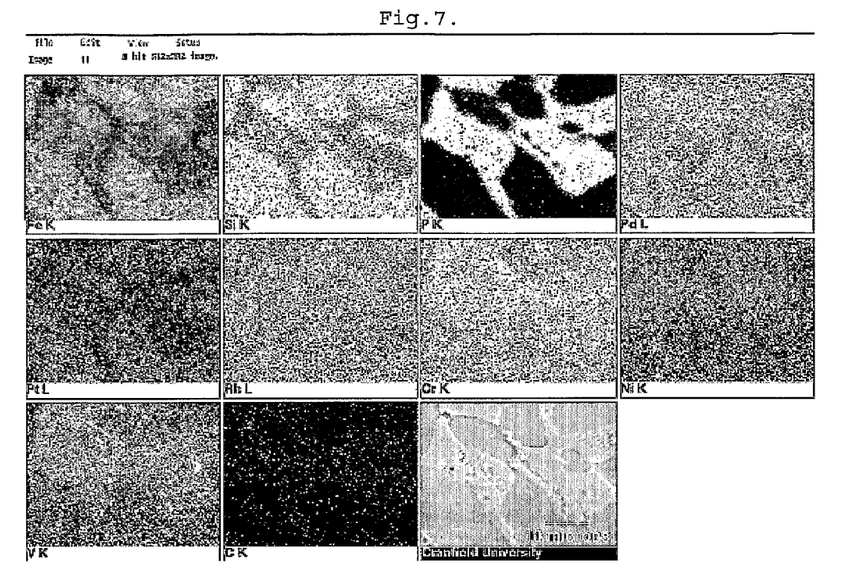
FIG. 7 shows 11 slides detailing an elemental distribution map.

FIG. 7 shows an elemental distribution map for the presumed austenite-steadite eutectic region shown in the micrograph, bottom right. The compounds in each frame, from left to right in descending rows are: Fe, Si, P, Pd, Pt, Rh, Cr, Ni, V and C. The main conclusions that can be drawn from these figures is the phase in which each element is predominantly concentrated.

Silicon can be clearly seen to be concentrated in the iron solid solution with phosphorus, chromium, vanadium and carbon concentrated in the steadite. Palladium, which is probably the most abundant of the platinum metals, is clearly concentrated in the iron rich phase together with platinum and, hence, probably rhodium.

Figure 8:
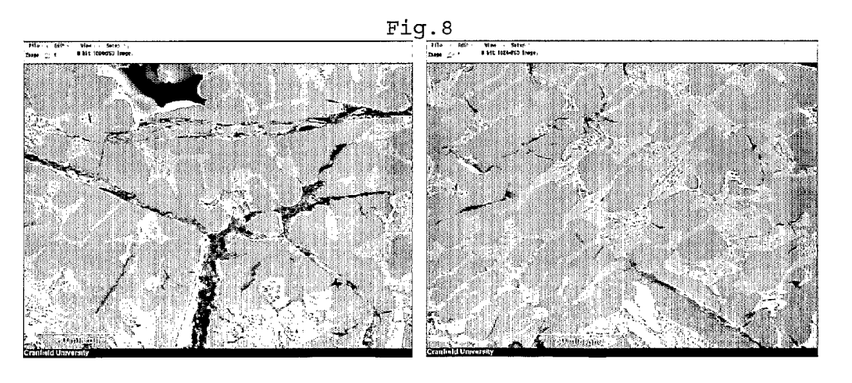
FIG. 8 shows general views of the eutectic and iron rich phase with voids partially filled with graphite.

FIG. 8 shows two views of the distribution of the interdendritic eutectic and the areas where graphite has been partially lost. The low atomic number of carbon results in the remaining graphite appearing dark although some of the voids have been filled with polishing debris.

Figure 9:
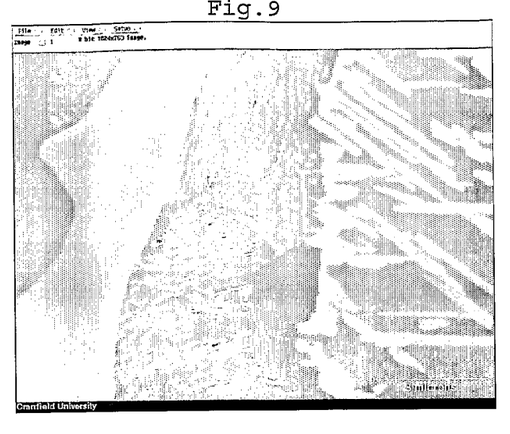
FIG. 9 shows a probable ledeburitic eutectic.

FIG. 9 shows an area which probably comprises the austenite-cementite ledeburitic eutectic with the cementite plates in three orthogonal orientations.

Figure 10:
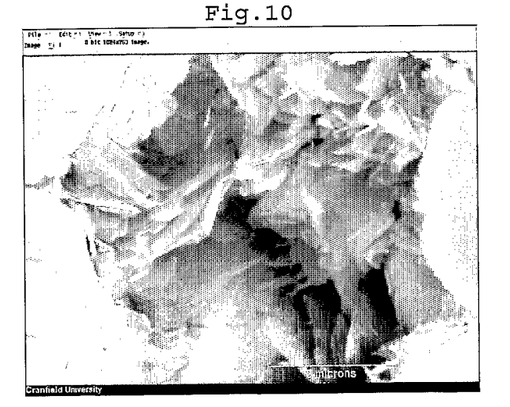
FIG. 10 shows a graphite structure.

FIG. 10 shows a typical graphite structure confirming that the dark phase is graphite and FIG. 11 shows the veining in the presumed austenite phase in more detail.

The binary systems between iron and the elements in solid solution, such as silicon, normally have a wide freezing range under conventional casting conditions and tend to show marked segregation effects. This may have happened on a very small scale owing to the rapid cooling experienced by this sample.

Hardness measurements on the same chill-cast sample gave 253, 258, 258 and 275 HV30. These values are what could be expected from a grey iron comprising an austenitic structure reinforced with the hard steadite eutectic, and are also typical of a high silicon iron.

This is an unusual alloy in that it is a non-typical composition that has been chill cast and although cast iron is a ubiquitous material, the non-equilibrium structures of thin sections have not been duly investigated as they have not been of commercial interest. The most likely explanation of the microstructure of this sample is that the high cooling rate has caused it to solidify as if it were a hypereutectic alloy forming primary 'kish' graphite then dendrites of supersaturated austenite, possibly as a ledeburitic eutectic, with the final phosphorus-rich liquid in the interdendritic spaces forming the iron-iron phosphide eutectic, steadite.

The platinum-group-metals appear to be concentrated in the iron rich phase in solid solution, along with silicon.

The recovery method of the present invention can be optimised for a particular precious-metal bearing waste stream and so it delivers accurate inventory management and very high technical recovery rates. The solution has exceptional efficacy and is very commercially competitive and flexible with respect to waste stream characteristics. All this is delivered with minimal environmental impacts, such as atmospheric emissions and secondary wastes.

The invention claimed is:

1. A continuous process for obtaining a precious-metal-rich composition from a feedstock material, the process comprising the steps of:
   (i) heating a feedstock material in a plasma furnace to form an upper slag layer and a lower molten metal layer,
   (ii) removing the slag layer;
   (iii) removing the molten metal layer;
   (iv) casting the molten metal onto a casting table and allowing the removed molten metal to solidify as a solidified metal layer;
   (v) fragmenting the solidified metal layer to form fragments; and
   (vi) recovering a platinum-group metal-rich composition from the fragments;
   wherein the feedstock material comprises a platinum-group-metal-containing material and a collector metal, said collector metal being a metal or an alloy that is capable of forming a solid solution, an alloy or an intermetallic compound with one or more platinum-group metals;

wherein the collector metal comprises iron.

2. The process according to claim 1, wherein the platinum-group-metal-containing material comprises one or more of an autocatalyst, a chemical catalyst, a petrochemical catalyst, a pharmaceutical catalyst, electrical and electronic equipment waste, thermal barrier coating waste, foundry sweeps, electroplating and/or metal finishing waste, jewellery and/or jewellery process waste and dental and/or medical waste.

3. The process according to claim 1 wherein the feedstock material further comprises at least one fluxing agent selected from boron trioxide, calcium oxide, calcium carbonate, sodium oxide, potassium oxide, silicon dioxide, aluminium oxide and magnesium oxide, including mixtures of two or more thereof.

4. The process according to claim 1 wherein the heating in step (i) yields a partitioning/distribution coefficient, determined by dividing the concentration of platinum-group metals in the molten metal layer by the concentration of platinum-group metals in the slag layer, which is 500 or greater.

5. The process according to claim 4 wherein in step (i) the partitioning/distribution coefficient, determined by dividing the concentration of platinum-group metals in the molten metal layer by the concentration of platinum-group metals in the slag layer, is 1000 or greater.

6. The process according to claim 1 wherein the furnace comprises one or more plasma device, said device being a plasma torch or an electrode, which achieves a temperature of from 1200° C. to 1600° C. in the furnace, the device being precessable over the furnace contents.

7. The process according to claim 1 wherein the removed molten metal layer is solidified at an initial cooling rate of at least 200° C/s.

8. The process according to claim 1 wherein the fragments produced in step (v) have an average particle size of from 10 cm to 100 microns.

9. The process according to claim 1 wherein step (vi) is performed by eddy current separation or by magnetic separation.

10. The process according to claim 1 wherein at least a part of the platinum-group metal-rich composition is reintroduced into the process as collector metal.

11. The process according to claim 1 wherein the process further comprises the step of: (vii) refining the platinum-group metal-rich composition to obtain one or more platinum-group metals.

12. The process according to claim 1 wherein the platinum-group metal-rich composition comprises an alloy, an intermetallic compound or a solid-solution of one or more platinum-group metals within the crystal structure of one or more phases of the collector metal.

13. The process according to claim 12 wherein the collector metal comprises iron.

14. The process of claim 1 performed in an apparatus comprising:
(1) a plasma furnace for heating a feedstock material;
(2) a casting table;
(3) a fragmentation device for fragmenting the cooled metal layer; and
(4) a separation unit for recovering a platinum-group metal-rich alloy from the fragments;
wherein the plasma furnace has an input port and at least one output port, is heated by one or more plasma device and is adapted to permit slag removal;
said plasma device being a plasma torch and/or electrode, and
wherein the casting table allows for continuous casting of the molten metal layer to form a solidified sheet.

15. The process of claim 14, wherein the furnace is continuously indirectly water-cooled and has a refractory hot-face lining.

16. The process of claim 14, wherein the plasma device uses a gas comprising an inert gas to produce a plasma arc that may be focused adjustably across the surface of the contents of the furnace.

17. The process of claim 14, wherein the separation unit is a magnetic separator or an eddy current separation unit.

18. The process of claim 1, wherein the solidified metal layer in step (iv) has a thickness between 1 mm and 30 mm.

19. The process of claim 1, wherein the fragments comprise fragments of platinum-group metal-rich composition and fragments of slag.

* * * * *